United States Patent [19]

Greidanus et al.

[11] Patent Number: 5,109,375
[45] Date of Patent: Apr. 28, 1992

[54] RECORD CARRIER FOR THERMO-MAGNETIC RECORDING AND MAGNETO-OPTICAL READOUT OF INFORMATION

[75] Inventors: Franciscus J. A. M. Greidanus, Waalre, Netherlands; Peter F. Carcia, Wilmington, Del.; Wouter B. Zeper, Bergeijk, Netherlands; Friedrich J. A. den Broeder, Geldrop, Netherlands; Willem F. Godlieb, Eindhoven, Netherlands

[73] Assignee: U.S. Philips Corporation, New York, N.Y.

[21] Appl. No.: 384,587

[22] Filed: Jul. 24, 1989

[30] Foreign Application Priority Data

Dec. 24, 1988 [NL] Netherlands ............... 8803168

[51] Int. Cl.$^5$ .................. G11B 11/00; G11B 3/70
[52] U.S. Cl. .................. 369/13; 369/283; 369/286; 369/288
[58] Field of Search ............ 365/122; 360/59, 114, 360/135; 428/692, 694, 900, 212, 668, 928; 369/13, 110, 273, 286, 288

[56] References Cited

U.S. PATENT DOCUMENTS

| | | | |
|---|---|---|---|
| 4,587,176 | 5/1986 | Carcia | 360/135 |
| 4,635,076 | 1/1986 | Willson | 365/122 |
| 4,678,721 | 7/1987 | den Broeder | 428/928 |
| 4,731,300 | 3/1988 | Watanabe | 428/668 |
| 4,753,853 | 6/1988 | Sato | 428/679 |
| 4,789,606 | 12/1988 | Yamada | 428/928 |
| 4,842,956 | 6/1989 | Kobayashi | 428/212 |
| 4,882,231 | 11/1989 | Aratani | 428/928 |
| 4,889,756 | 12/1989 | Barzynski | 369/288 |

Primary Examiner—Stuart S. Levy
Assistant Examiner—Tan Nguyen
Attorney, Agent, or Firm—Leroy Eason

[57] ABSTRACT

A record carrier for thermomagnetic recording of information and magneto-optical readout of the recorded information. The record carrier includes a substrate and a recording layer thereon in the form of multi-layers of magnetic and non-magnetic material, the magnetic layers predominately containing cobalt and the non-magnetic layers predominantly containing transition metal. The magnetic and non-magnetic layers alternate, and the overall thickness of the complete multi-layer recording layer is less than 75 nm. Such a recording layer achieves a significant improvement in both thermomagnetic write properties and magneto-optical read properties.

18 Claims, 4 Drawing Sheets

RECORD CARRIER FOR THERMO-MAGNETIC RECORDING AND MAGNETO-OPTICAL READOUT OF INFORMATION

BACKGROUND OF THE INVENTION

1. Field of the Invention

The invention relates to a record carrier for thermomagnetic recording of information and magneto-optical read-out of the recorded information.

2. Description of the Related Art

Thermomagnetic recording of information is a known recording method which is disclosed, for example, in *Philips Tech. Rev.* 42, No. 2, pp. 51-58 (1985). In this method a record carrier is used which has a substrate and a thermomagnetic recording layer thereon. To record information, the record carrier is exposed to a light beam originating from, for example, an AlGaAs laser, having a wavelength of approximately 820 nm. The laser beam is focussed on the recording layer by means of a lens system. Such layer includes a magnetic recording material having a perpendicular magnetic anisotropy, the easy axis of magnetization being perpendicular to the layer surface. In the areas which are exposed to the laser beam the temperature of the magnetic material increases, and subsequently the direction of magnetization of the heated areas is reversed. Such reversal can take place spontaneously in response to interaction with the magnetic field of the adjacent magnetic material.

Preferably, however, the direction of magnetization is reversed by application of an external magnetic field whose field direction is opposite to the original direction of magnetization of the recording layer. After exposure, the magnetic material cools and the reversed direction of magnetization becomes fixed, the areas having reversed magnetization being representative of the recorded information. This information can be read by means of a beam of polarized laser light, on the basis of magnetic rotation of the polarization plane of such beam. This rotation is known as the Kerr-effect in the case of reflection and as the Faraday effect in the case of transmission of polarized light.

So far only two classes of magnetic materials are known in which thermomagnetic recording of information is possible. Although many magnetic materials are known which evidence perpendicular anisotropy, only a few of these, belonging to said two classes, have been found to be suitable for thermomagnetic recording.

This is not very surprising since for thermomagnetic recording the properties of the material must satisfy very severe requirements. In addition, these requirements are often of opposite nature; that is to say, satisfying one means that satisfying the other is more difficult. The various properties which the thermomagnetic recording material should have are a) a perpendicular magnetic anisotropy b) a rectangular BH hysteresis curve (i.e. a remanence of 100%), with high coercive force $H_c$ at ambient temperature. The $H_c$ value must exceed the writing field strength, i.e. larger than 40 kA/m, c) a high magneto-optical figure of merit, $R\theta^2$, wherein R represents the reflectivity and $\theta$ the rotation of the polarization plane of light on interaction with the recording material, d) a relatively low Curie temperature $T_c$, e) a magnetic switching characteristic such that switching of the direction of magnetization can be effected at various powers of the write beam and at minimal strength of the (external) magnetic field used, preferably less than 40 kA/m, f) low disk noise and write noise, g) be properly workable at low temperature, and h) appropriate physical and chemical stability.

The two classes of materials which reasonably satisfy these requirements are

1. The class of amorphous rare earth metal and transition metal alloys, such as those described, inter alia, in Appl. Phys. Lett. 22 337 (1987). Well-known and properly efficient materials of this class are, for example, GdTbFe or TbFeCo.

2. The class of oxidic compounds. In this class a further distinction can be made between (mono) crystalline garnets and ferrites. Thermomagnetic recording employing monocrystalline garnet layers is disclosed, inter alia, in J. Appl. Phys. 36, 1110 (1965). The use of ferrites is described in U.S. Pat. No. 4,586,092.

The prior art thermomagnetic recording materials described above have various disadvantages.

Ferrites have the drawback that the noise introduced by this material is relatively high. This causes a low signal-to-noise ratio (SNR), so that these materials are not so suitable for the recording of, for example, video (image) signals. A further drawback is that the ferrite layers must be processed into a recording layer at an elevated temperature. Thus, these materials are deposited on a substrate by, for example, sputter deposition at 400°-500° C. This means that the substrate must be capable of withstanding such high temperatures. It is therefore not feasible to use a synthetic resin substrate or a substrate coated with a synthetic material layer. But it is precisely the use of a synthetic resin substrate or a substrate coated with a synthetic resin layer which is of great practical importance, because it is possible to form a guide track, for example a helical groove, in a simple and cheap manner in such a synthetic resin. By means of the guide track the laser light beam is guided and controlled during the writing or reading process.

Monocrystalline rare earth metal containing garnets have the disadvantage that their production is very expensive. In practice, monocrystalline layers of this type are only marginally suitable for thermomagnetic recording, and actually only for special, professional applications. The substrate onto which such a monocrystalline layer is provided must be a non-magnetic, monocrystalline garnet material. Also in this case there is the above-mentioned drawback that the use of substrates containing a synthetic resin material is excluded. In addition, these materials have a very high transmission, so that energy transfer from the write laser beam is very low.

Thermomagnetic recording layers of GdTbFe or TbFeCo have up to now proved to be the most promising materials, but have the important disadvantage of strong susceptibility to corrosion (oxidation). As a result, the layers become unsuitable for recording after a short period of time and, in addition, the material already recorded is lost. To obviate this drawback it has been proposed to provide protective layers, but this only partially alleviates the corrosion problem. Moreover, this additionally complicates the structure of the record carrier, which consequently becomes more expensive.

A further disadvantage of the use of rare earth metal and transition metal alloys for thermomagnetic recording is the magnitude of the magneto-optical effect of this material. Magneto-optical effect is here to be understood to mean the rotation of the polarization plane of the polarized laser beam used for read-out. As will be described in more detail hereinafter, the magnitude of this effect plays an essential role during read-out of thermomagnetically recorded information. It has been found that the magnitude of this effect, unfortunately, decreases at shorter wavelengths of the read beam. More specifically, for a wavelength shorter than 820 nm, which at present is that most used for the read beam. If shorter wavelengths could be used, for example produced by what is commonly denoted a blue laser, then writing and/or reading could be effected with a higher recorded information density.

SUMMARY OF THE INVENTION

The invention provides a record carrier for thermomagnetic recording of information and magneto-optical read-out of the stored information, and which does not have the disadvantages described above.

Such a record carrier has a substrate and a recording layer thereon which is a multi-layer, the multi-layer comprising a plurality of layers of magnetic and non-magnetic material. The magnetic layers are predominantly Co-containing, and they are each of a thickness of not more than 1.2 nm. The non-magnetic layers each include at least one transition element and have a thickness of not more than 2.4 nm. The magnetic and non-magnetic layers are applied alternately. The overall thickness of the multi-layer is not more than 75 nm, and it has an easy axis of magnetization which is perpendicular to the substrate surface and an $H_c$ value of at least 40 kA/m. To record on the multi-layer it is locally exposed to a laser beam so that in the exposed areas the temperature of the multi-layer is increased, and consequently the direction of magnetization thereof is reversed. The areas with reversed magnetization constitute the recorded information bits, and can be read out by a polarized laser beam on the basis of rotation of the polarization plane of such beam.

BRIEF DESCRIPTION OF THE DRAWINGS

The drawings include eight Figures, wherein.

DESCRIPTION OF THE PREFERRED EMBODIMENTS

Figure 1:
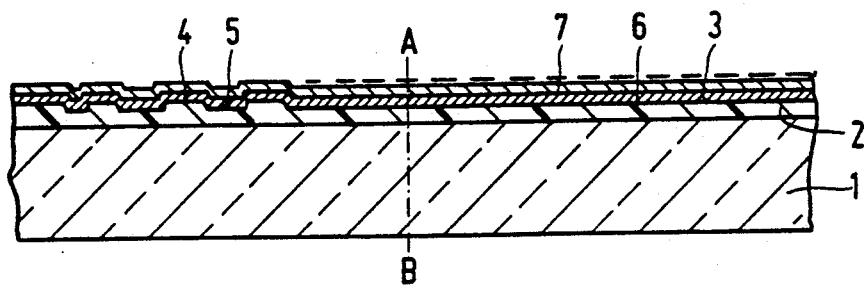
FIG. 1 is a tangential cross-sectional view of a magneto-optical record carrier according to the invention.

A record carrier in accordance with the invention has a novel type of recording layer for thermomagnetic recording. As will be described in greater detail hereinafter, the class of multi-layer materials used herein has a number of properties which are comparable to or considerably better than those of the prior-art recording layers, which are based on the two known above-defined classes of thermomagnetic recording materials. It should be noted that "predominantly containing Co." as used herein means that the magnetic layers are at least 90% by weight of Co. It is noted however, that some interdiffusion of the Co and the non-magnetic transition elements can occur at the boundaries of the magnetic layers and the non-magnetic layers. In that case, there may be a somewhat lower amount of Co. in the magnetic layers, especially when the Co-layers are thinner than 0.6 nm. It should also be noted that "transition elements" are here to be understood to be elements from the columns VIII and I-B of the periodical system having an atomic number exceeding 44, such as more specifically Ft, Pd, Rh and Ir.

The multi-layer recording layer of the thermomagnetic record carrier of the invention is chemically and physically very stable. In particular, no corrosion problems occur with this recording multi-layer, so that the record carrier is usable for a long period of time and the stored information is retained. Repeated write tests have demonstrated that the direction of magnetization of the magnetic domains of the recording material can be changed at least a thousand times without chemical and/or structural changes being observable in the recording multi-layer.

The magneto-optical effect of the thermomagnetic recording layer used in accordance with the invention is sufficiently high so that a high signal-to-noise ratio, for example 50 dB or more, can be achieved at a bandwidth of 30 kHz, a carrier of 1 MHz and a linear scanning velocity of 5 m/s. Multilayers containing Pt and/or Pd as the non-magnetic layers have especially high values of the C/N ratio. With relatively short wavelengths of the read laser beam this effect surprisingly increases still more, and is even considerably greater than the magneto-optical effect of prior-art recording layers of GdTbFe. Measurements at a wavelength of 400 nm on a multi-layer formed by 0.5 nm thick Co-layers and 0.9 nm thick Pt-layers prove that the magneto-optical effect is approximately twice as high as with a GdTbFe recording material.

The Curie point (TC) of the multi-layered recording layer of the record carrier in accordance with the invention is low, namely below 700° K. This is surprising since the Co and non-magnetic materials are in separate layers. Thus one might have expected a rather high $T_C$, characteristic of Co-metal. The comparatively low $T_C$ is very advantageous for the thermomagnetic writing process, since in this process the multi-layer is locally heated to near its $T_C$ followed by a reversal of the direction of magnetization in these locations. For magnetic multi-layers having such a low $T_C$ it was found in repeated write tests (1000 times) that the structure and the composition of the multi-layers is not or is hardly influenced by a temperature increase up to the $T_C$.

The record carrier according to the invention has in addition a high magneto-optical figure of merit, which is determined by the product $R.\theta^2$, wherein R is the reflectivity and $\theta$ the Kerr-rotation of the multi-layer. The high value of the figure of merit shows the advantage of the multi-layer recording layer for thermomagnetic recording since the figure of merit is proportional to the signal-to-noise ratio achievable on read-out. A value of, for example, 55 dB and higher, enables storage and read-out of video information.

The coercive force $H_c$ at ambient temperature of the multi-layer used is relatively high, namely not less than 80 kA/m. This high value ensures that the thermomagnetic domains have an adequate stability at ambient temperature.

In addition, the record carrier has a perpendicular anisotropy. In experiments leading to the invention it was demonstrated that this is only the case if the thickness of the separate Co-layers is less than approximately 1.2 nm.

It has further been found that the thickness of the multi-layer recording layer of the record carrier is of great importance, and must be less than 75 nm. It has been demonstrated that at a larger thickness a relatively fast heat dissipation in the multi-layer occurs during the thermomagnetic write procedure. Moreover, the heat capacity of a thin multilayer increases with increasing thickness. Consequently, the laser energy required for the writing operation becomes relatively high, which is a drawback for practical applications.

The domains (or bits) written thermomagnetically in the record carrier of the invention are of a perfect shape. This is of great importance, as irregularities in the written domains produce so-called "write noise". It has been found that this type of noise is an important contribution to the total noise. Because of the perfect shape of the domains (bits) the measured write noise of the record carrier is very low. It has been demonstrated that this write noise is less than the disc noise.

In this connection it should be noted that writing of the magnetic domains on the record carrier can be effected in different ways. In accordance with a first method, the record carrier is supported in a constant magnetic field which is directed oppositely to an initial direction of magnetization of the recording layer of the record carrier. The information is written-in by exposure of the recording layer to modulated laser light, the direction of magnetization being reversed in the exposed areas (laser modulation technique). In accordance with a second method an area of the recording layer of the element is exposed to a continuous (unmodulated) laser light beam. In this heated region, by applying an external magnetic field which is modulated in conformity with the information to be recorded, information bits with an opposite magnetization are written-in. The field direction is varied at a high velocity. This is denoted the field modulation technique. Both methods can be successfully applied to a record carrier according to the invention. Generally, the field modulation technique has the advantage that information already present can directly be written-over, without the necessity of first erasing the recording layer. In addition, a further method can be used in which both the write laser and the magnetic field are modulated.

In an advantageous embodiment of the invention, a multi-layer recording laser is used whose non-magnetic layers predominantly consist of Pt. Predominantly must here be understood to mean that these layers have a minimum of 90% wt. Pt. It has been found that because of the particularly high insensitivity to oxidation of such a recording layer the stored information bits remain intact for a very long period of time. The recording layer which are least sensitive to oxidation are obtained by using non-magnetic layers which entirely consist of Pt.

In another advantageous embodiment of the invention, the Co-containing magnetic layers have a maximum thickness of 0.6 nm. It has been found that the recording layer then has a remanence of 100% ($M_r/M_s = 1$). This is of particular importance to provide an optimum switching characteristic.

In accordance with a further preferred embodiment, the multi-layer recording layer has an overall thickness of not more than 40 nm. It has been demonstrated that this thickness approximately corresponds to the penetration depth of the laser write beam generally used (laser energy $\simeq 15$ mW).

In another interesting embodiment of the invention, the total thickness M of the magnetic layers and the total thickness N of the non-magnetic layers are defined by the formula $1 < N/M < 5$. Calculations and experiments resulting in the present invention have shown that very good write and read properties are obtained when the thicknesses of the magnetic and the non-magnetic layers of the multi-layer satisfy this condition. It has been found in particular that if N/M is chosen to be less than 1, the remanence of the recording layer is relatively low. If N/M is chosen to be higher than 5, the Kerr-rotation appears to be relatively small.

A further interesting embodiment is characterized in that the thickness of the individual Co-containing layers amounts to 0.3–0.5 nm, and the thickness of the individual Pt-containing layers amounts to 0.8–1.2 nm. In this embodiment a high Kerr rotation is obtained in combination with a high remanence.

The record carrier according to the invention has a substrate and a recording layer applied thereon in the form of a multi-layer, which multi-layer comprises a plurality of magnetic, predominantly Co-containing, layers with a maximum thickness of 1.2 nm per layer, and also a plurality of non-magnetic layers, which each include at least one transition element and have a maximum thickness of 2.4 nm per layer. The magnetic and the non-magnetic layers alternate, and the maximum thickness of the multi-layer is not more than 75 nm. The multi-layer has an easy axis of magnetization which is perpendicular to the substrate surface, and a coercivity value $H_c$ of at least 40 kA/m.

It should be noted that the laid-open European Patent Application EP-A 241.080 discloses a multi-layer magnetic recording layer, the multi-layers being alternate Co-layers and Pd-layers. Information is written therein magnetically by a magnetic head, the direction of magnetization being locally reversed under the influence of the magnetic field of the magnetic head. The overall thickness of the multi-layers described in said Patent Application exceeds 190 nm.

In the record carrier according to the present invention the information is preferably written and read via the substrate, so that the substrate must be transparent to the laser beam. In this form of recording and reading it is achieved that any dust particles or any other contaminations on the surface of the substrate do not negatively affect the write or read quality, as they are outside the depth of focus of the objective by means of which the light beam is focussed onto the recording layer. The transparent substrate is made of, for example, glass, quartz or a transparent synthetic material such as, for example, polycarbonate or polymethyl methacrylate.

At the side facing the recording layer the surface of the substrate is preferably provided with an optically scannable guide track, in the form of, for example, a groove which usually is of helical or a circular shape. This groove may partly be provided with optically readable information bits, which control, for example, the write and read procedure. The optically readable bits are alternately located at a higher and a lower level, which causes the track thus obtained to have a crenelated shape. The information bits are read in reflection on the basis of phase differences in the reflected light. Magneto-optical recording can be effected in both the groove and at the dike portions located between the groove turns.

When a glass substrate is used, the track is preferably made in a separate synthetic resin material layer provided on the substrate and consisting of, for example, light-cured acrylic esters. The recording layer is then applied on top of this layer.

The recording layer may further be covered by a protection coating, for example a layer consisting of a light-cured lacquer, made of, for example, acrylic esters. An interesting feature is the possibility to glue or cement two recording elements of the invention to each other, the recording layers of the two elements then facing each other.

In an interesting embodiment of the present invention a dielectric layer is situated between the recording layer and the substrate and which contains, for example, an inorganic oxide, nitride, selenide, etc. Examples of suitable layers are layers made of $Si_3N_4$, AlN, SiO, $SiO_2$, ZnO, $Zn_3N_2$, $ZnSi_3N_2$, ZnSe, $ZrO_2$, $TiO_2$, and $AlZrN_2$. The use of such a layer results in a higher figure of merit.

It should be noted that in the prior-art thermomagnetic recording layers in which, for example, GdTbFe is used, the choice of the dielectric layer is limited to oxygen-free materials in view of the sensitivity to oxidation. This does not hold for the thermomagnetic recording layer in accordance with the present invention.

A further embodiment of a record carrier in accordance with the invention, which can be used with great advantage, is characterized in that a reflection layer is applied on the side of the recording layer remote from the substrate. Such a recording layer can only be written in and be read through the substrate. On reading, the read laser beam passes the recording layer twice. Compared with a recording layer without a reflection layer, an element with a reflection layer has the particular advantage that the Kerr rotation of the detected readout beam is under certain circumstances significantly increased. This effect strongly depends on the material of the reflection layer and the thickness of the multilayer. For instance, the application of a reflection layer of Al on a 40–50 nm thick recording layer provides an important increase in the signal-to-noise ratio. The reflection layer is usually constituted by a vapor-deposited or sputtered metal mirror. Suitable metals for this mirror are Al, Au, Ag, Pt, Cu and Ti.

In a further advantageous embodiment of the invention, a further dielectric layer is provided between the recording layer and the reflection layer. This dielectric layer preferably contains the same material as the dielectric layer described above between the substrate and the recording layer. The use of this further dielectric layer has the advantage that the figure of merit of the recording element is still further improved thereby and consequently a still better signal-to-noise ratio can be realized. Applying such a second dielectric layer is only advantageous for thin recording layers, for example thinner than 40 nm. Preferably, the overall thickness of the recording layer is then 10–25 nm.

In a still further interesting embodiment the record carrier has at least two multi-layer recording layers which are magnetically non-coupled and separated by a spacer layer, the thickness of at least one of such recording layers being less than 40 nm. In practice it has been found that the recording layer can be very thin, the thermomagnetic and magneto-optical properties remaining adequate. Such thin layers are necessary in multi-layer systems, because the layer or layers in a more exterior position must be written or read through the layer or layers located closer to the substrate. Consequently, the layer or layers in a more interior position must have some degree of transparency to the laser beam used so as to permit the beam to reach the more exteriorly located layer. For this reason the more interiorly located layers must be thinner than 40 nm, more specifically preferably 10–30 nm thick. In this connection it should be noted that with prior-art thermomagnetic recording materials employing alloys of amorphous rare earth metal and transition metal, a multilayer recording layer is not possible. This is because the sensitivity to oxidation of such known materials is so high that thin layers thereof do not have an adequate lifetime.

It is particularly advantageous for the spacer layer to contain an organic polymer, preferably a photopolymerized lacquer, for example on the basis of acrylic esters.

Of special importance is also a multi-layer recording layer composed of a write sector and a parallel extending read sector, each having a plurality of magnetic and non-magnetic layers, the thickness (M) of the individual magnetic layers and the thickness (N) of individual non-magnetic layers being chosen such that it holds that: (N/M) read sector < (N/M) write sector. The use of a multi-layer recording layer renders it possible to separate the read function and the recording function in the recording layer in a simple manner and to optimize them separately. This is realized by increasing the Kerr rotation in the sector of the multi-layer where the read procedure is mainly effected (read sector). Such increase is achieved by increasing the relative thickness of the magnetic layers in this sector. In the other sector, in which the thermomagnetic write procedure is mainly effected (write sector), the thickness of the individual magnetic and non-magnetic layers must be chosen such that the properties of the multi-layer there are optimally suitable for thermomagnetic recording. In practice it has been found that this implies that the Co-content of the read sector exceeds the Co-content of the write sector.

It preferably holds for such a recording layer that the overall thickness of the read sector and the overall thickness of the recording sector are in a ratio of 1 : 3. It is further advantageous for such a recording element if (N/M) read sector = 3/2 (N/M) write sector = 9/4.

Interesting is also an embodiment wherein the non-magnetic layers of the read sector are essentially Pt and the non-magnetic layers of the write sector are essentially Pd. This embodiment allows a further optimizing of both the recording and read-out characterized of a single recording multilayer.

The multi-layer used in the record carrier can be produced in known manner by means of vacuum vapor deposition of the individual magnetic and non-magnetic layers. Deposition by means of vacuum vapor deposition, for instance e-beam evaporation, has the advantage that the deposited multilayers have high $H_C$ values. The thickness of the layers can be realized in a manner known per se by control of the temperature of the metal sources and/or the deposition time of the individual elements.

Another interesting embodiment is a record carrier having a magnetic recording layer constituted by a multi-layer which is magnetically exchange-coupled to a second magnetic recording layer of the element. The second recording layer may also be a multi-layer, or may consist of a known recording material, for example GdTbFe or TbCoFe. As is described in inter alia the laid-open European Patent Application No. 258.978, recording layers of that type offer interesting possibilities for use in thermomagnetic recording methods of the type known as "direct overwrite". The use of at least one multi-layer in this recording method has the advantage that the total layer thickness can be very thin, so that the write laser energy required is small. In addition, exchange-coupled thin layers, having, for example a thickness less than 30 nm, but preferably less than 20 nm, have the advantage that this coupling occurs much more efficiently than with thicker layers.

Figure 1A:
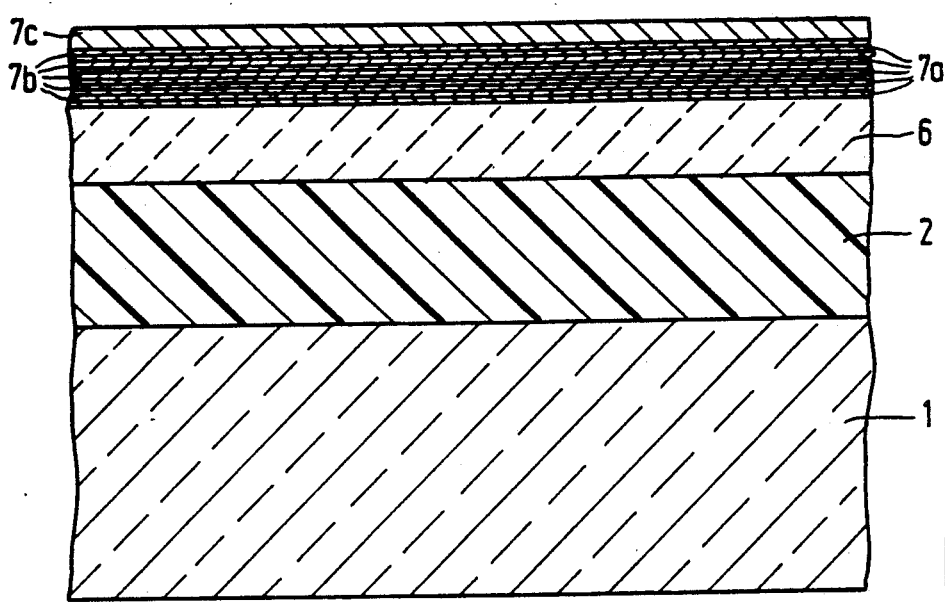
FIG. 1A is a cross-sectional view taken on the line A–B of FIG. 1.

Referring now to FIG. 1, there is shown a record carrier in accordance with the invention. A glass substrate 1 having a diameter of five inches is coated with a layer 2 of a photopolymerizable lacquer of acrylates. The uncured lacquer was applied between the substrate and a matrix of a desired guide track, such a matrix having a surface which is a negative of the desired guide track. The lacquer was cured by exposing it to UV-light through the substrate. Thereafter, the matrix was removed. In this manner a guide track in the form of a groove 3 was formed in the lacquer layer 2. The track is provided with control information constituted by optically readable information bits which are alternately located at a higher level 4 and a lower level 5. Such bits can be read in reflection by a weak laser beam, not shown, on the basis of phase differences in the reflected light originating from a bit at a higher level and a bit at a lower level. Layer 2 was coated by sputtering with a dielectric layer 6 consisting of AlN having a thickness of 80 nm. A magneto-optical layer 7 in the form of a multi-layer (see FIG. 1A) was vapor deposited on top of the dielectric layer. For that purpose the substrate 1 provided with the layers 2 and 6 was placed in a belljar which was thereafter evacuated to a pressure of $4 \times 10^{08}$ mbar. As seen in FIG. 1A, the layer 7 includes Co-layers 7a having a thickness of 0.24 nm and Pt-layers 7b having a thickness of 1.74 nm which were successively deposited by electron beam evaporation. During the deposition of the Co and the Pt the pressure was kept at $5 \times 10^{-7}$ mbar. The deposition rates of the Pt and Co-metal sources were kept constant at a rate between 0.1–0.2 nm/s with the said of quartz oscillators. The metal vapor flows were controlled by shutters. The overall thickness of the multi-layer was approximately 50 nm. The total number of Ft and Co-layers was 50 in this case. For the sake of clarity, only 10 layers are shown in FIG. 1A. In a number of cases a reflection layer 7c of metal, for example Al, Ag, Au, Ti, Cu or Pt having a thickness of 30 nm was evaporated on the recording layer, thus forming together with the multi-layer 79, 76 and the dielectric layer 6 a "tri-layer" structure. In some cases a second dielectric layer, not shown in FIG. 1 and 1A was applied between the multi-layer and the reflection layer, so as to achieve a "quadri-layer" structure.

Figure 2:
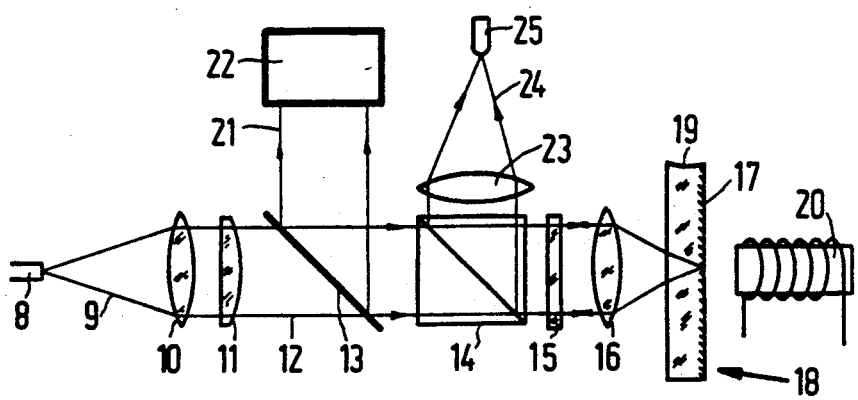
FIG. 2 is a schematic view of a recording arrangement which can be used for a record carrier according to the invention.

FIG. 2 shows an arrangement for thermomagnetically recording and optically reading information on the above-described record carrier. An AlGaAs laser 8 produces a pulsed light beam 9 having a wavelength of 820 nm, the beam being pulsed (modulated) in accordance with the information to be recorded. The light beam 9 passes through an objective 10 having a numerical aperture (NA) of 0.3. The astigmatism of the laser beam is corrected by passing it through a cylindrical lens 11. The parallel beam 12 thereafter passes through a partially transparent mirror 13 and a polarization splitter-cube 14 which transmits the parallel polarization component of the laser light, whilst the perpendicular component is reflected. The transmitted linearly polarized light passes a Faraday rotator 15 which shifts the polarization direction through a small angle. Thereafter the linearly polarized light is focussed by means of an objective 16 having a numerical aperture (NA) of 0.6 onto the recording layer 17 of the magneto-optical recording element 18. This recording element is identical to the element shown in the FIGS. 1 and 1A. Thus, the recording layer 17 is a multi-layer formed by alternately stacked Co and Pt-layers, provided on a glass substrate 19. Exposure to light of the recording layer is effected via said substrate 19. In the exposed places a temperature increase to approximately the Curie point is effected by light absorption. By means of a magnetic field having a force of $2 \times 10^4$ A/m generated by coil 20 the magnetization direction of the recording layer is rotated in an exposed place through 180°, thus forming an information bit with a reversed direction of magnetization.

Figure 1B:
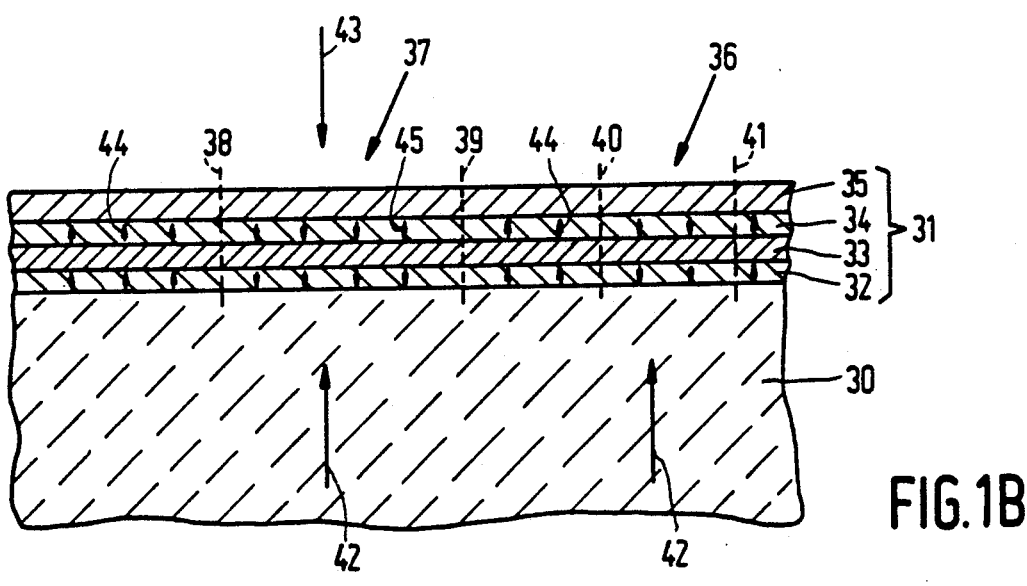
FIG. 1B is a cross-sectional view of the record carrier of FIG. 1 and 1A, with reference to which the recording process is described.

The recording of information is further illustrated in FIG. 1B. In this Figure, reference numeral 30 denotes a dielectric layer, applied on a glass substrate (not shown). Layer 30 is provided with a multi-layer 31. For the sake of clarity, only four sub-layers of multi-layer 31 are shown. Consequently, layer 30 is provided with a vapor-deposited layer of Co (32), Pt (33), Co (34) and Pt (35). The multi-layer 31 is exposed to modulated laser light via the layer 30, as is shown by means of the arrows 42. In an exposed spot 37 located between the broken line boundary faces 38, 39 the temperature of the multi-layer increases to the Curie point (approximately 700 K). This also occurs in the exposed spot 36, between the boundary faces 40 and 41. The direction of magnetization of the multi-layer is denoted by arrows 44 in the magnetic Co-layers 32 and 34. An external magnetic field whose direction is indicated by arrow 43 and whose magnitude is $2 \times 10^4$ A/m is applied across the plate. In the exposed spots 36 and 37 the direction of magnetization is reversed in response to the magnetic field 43. This is denoted by arrows 45 in the magnetic Co-layers 32 and 34.

Reading the stored information is further illustrated with reference to FIG. 2. A continuous light beam, weak in energy, coming from the AlGaAs laser 8 travels along the same light path as described in the foregoing for the write beam 9, 12. On reflection of the linearly polarized light beam from an information bit of the recording layer 17, the polarization plane is rotated through an angle $\theta_k$ (Kerr rotation) in response to the locally changed magnetization direction. The reflected read light beam again passes through objective 16, the Faraday rotator 15 and then arrives at the polarization splitter cube 14 wherein the parallel component is transmitted. After reflection from the partially transparent mirror 13 the parallel component 21 is applied to the control arrangement 22 for positioning and focussing of the laser light beam onto the recording layer 17 in the writing process. The perpendicular light component 24 of the read beam is reflected by the polarization splitter cube. Via an objective 23 the perpendicular component 24 is focussed onto and collected in a detector 25, constituted by, for example, an avalanche photodiode, so as to detect the Kerr rotation.

Optical and Magnetic Measurements

Table I shows results of optical and magnetic measurements on six different multi-layer record carriers. The column 1, denoted R, shows the test reference number. Column 2 shows the number L of bilayers, each consisting of one magnetic and a non-magnetic layer, of the multi-layer. Column 3 shows the thickness t (nm) of the individual Co and Pt layers. Column 4 shows the Kerr rotation ($\theta_K$) at 820 nm of the multi-layer. Column 5 shows the perpendicular anisotropy energy $K_{eff(kJ)}$ per unit of volume of Co. Column 6 shows the remanence ($M_r/M_s$) expressed as a percentage, and column 7 shows the coercive force $H_c$(kA/m). This Table clearly shows that the perpendicular anisotropy in the multi-layer is obtained when the thickness of the individual Co-layers is less than approximately 1.2 nm, since only then is $K_{eff}$ positive. In addition it is seen that a 100% remanence is obtained if the thickness of the individual Co-layers is less than approximately 0.6 nm.

TABLE I

| R | L | tCo (thickness) | tPt nm | θk | Keff | Mr/Ms | Hc |
|---|---|---|---|---|---|---|---|
| 1 | 25 | 0.24 | 1.74 | −0.06 | 1074 | 100 | 44 |
| 2 | 22 | 0.45 | 1.77 | −0.10 | 865 | 100 | 78 |
| 3 | 20 | 0.70 | 1.72 | −0.12 | 475 | 40 | 52 |
| 4 | 19 | 0.92 | 1.74 | −0.14 | 287 | 13 | 33 |
| 5 | 17 | 0.42 | 1.72 | −0.18 | −101 | 6 | 25 |
| 6 | 14 | 2.02 | 1.77 | −0.25 | −271 | 5 | 25 |

Figure 3:
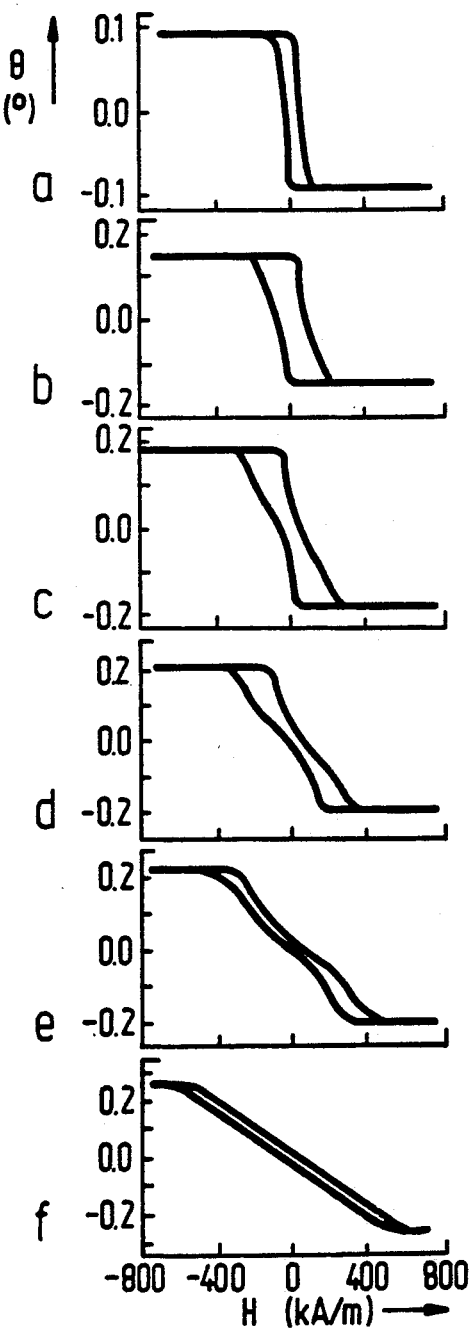
FIG. 3 shows the magneto-optical hysteresis loops of a recording layer having various numbers of Co/Pt multi-layers.

FIG. 3 shows the magneto-optical hysteresis loops of test samples of the six different embodiments listed in Table I, the Kerr rotation is being shown as a function of the applied field H. The six loops are for the respective test samples 1-6. From this Figure it can also be derived that 100% remanence is obtained if the thickness of the individual Co-layers is less than approximately 0.6 nm.

Figure 4:
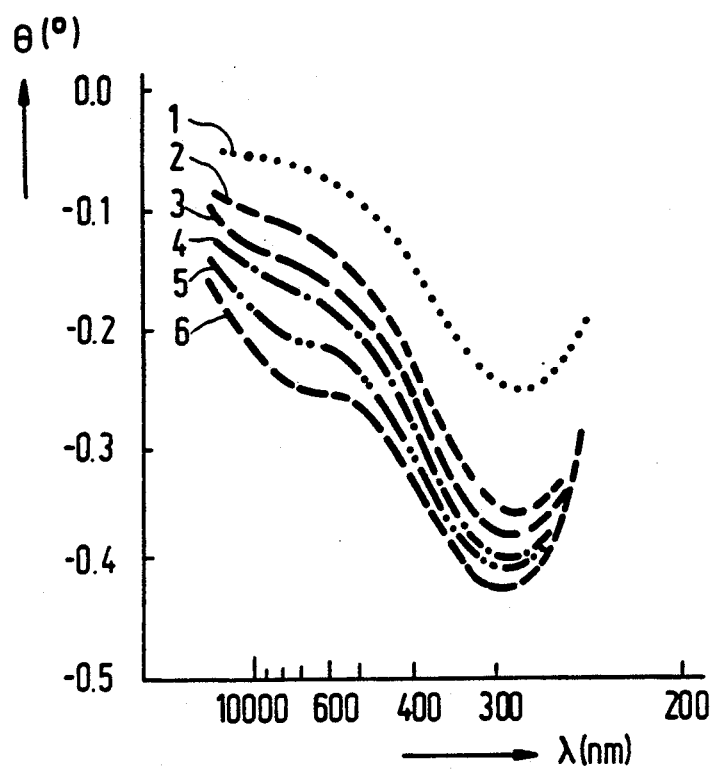
FIG. 4 shows the polar Kerr rotation as a function of the magnetic field applied to a recording layer having a number of Co/Pt multi-layers.

FIG. 4 shows curves of the polar Kerr rotation $\theta(°)$ as a function of the wavelength λ (nm) of the six samples listed in Table I. This Figure clearly shows that the polar Kerr rotation of the multi-layers increases when laser light with a relatively short wavelength is used. This indicates that the read-out of the multilayers according to the present invention increases in the so-called blue-region of the spectrum, which makes the present multilayer especially interesting in combination with the so-called blue-laser.

Table II shows a number of optical and magnetic properties of further different multi-layers for use in a magneto-optical recording layer. Table II also shows that 100% remanence is obtained if the thickness of the Co-layers is less than 0.6 nm.

TABLE II

| R | L | tCo (thickness) | tPt nm | θk | Mr/Ms | Hc |
|---|---|---|---|---|---|---|
| 7 | 35 | 0.31 | 1.30 | −0.10 | 100 | 88 |
| 8 | 30 | 0.30 | 1.55 | −0.08 | 100 | 100 |
| 9 | 30 | 0.31 | 1.74 | −0.07 | 100 | 100 |
| 10 | 25 | 0.32 | 1.90 | −0.07 | 100 | 80 |
| 11 | 35 | 0.40 | 1.27 | −0.12 | 100 | 100 |
| 12 | 30 | 0.39 | 1.49 | −0.11 | 100 | 112 |
| 13 | 25 | 0.41 | 1.71 | −0.09 | 100 | 100 |
| 14 | 25 | 0.41 | 1.98 | −0.07 | 100 | 100 |
| 15 | 30 | 0.62 | 1.32 | −0.13 | 28 | 88 |
| 16 | 25 | 0.62 | 1.43 | −0.12 | 30 | 65 |
| 17 | 25 | 0.62 | 1.63 | −0.11 | 47 | 88 |
| 18 | 22 | 0.62 | 1.98 | −0.10 | 66 | 88 |
| 19 | 50 | 0.45 | 0.58 | −0.29 | 11 | 50 |
| 20 | 40 | 0.40 | 0.92 | −0.20 | 73 | 100 |

Figure 5:
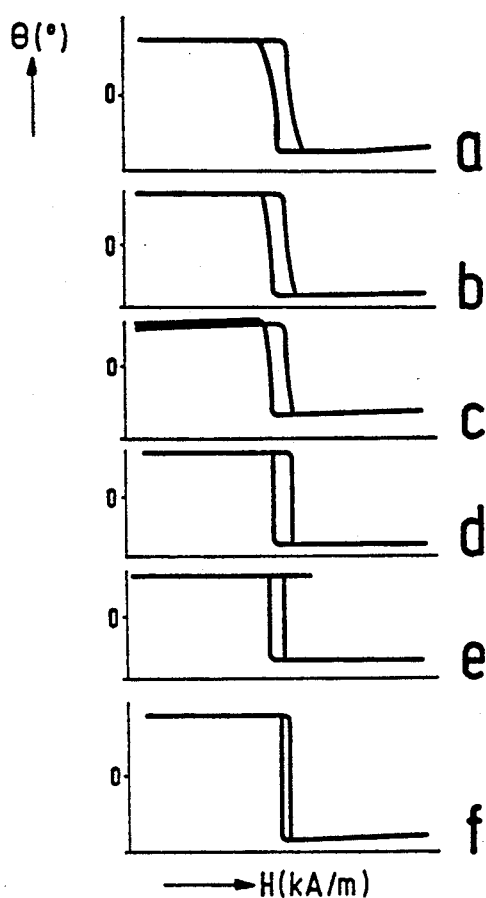
FIG. 5 shows the polar Kerr rotation as a function of the magnetic field applied to a recording layer having varying thicknesses of Co/Pt multi-layers.

FIG. 5 shows the magneto-optical hysteresis loops measured at a wavelength λ of 530 nm of six different recording multi-layers, the thickness of the Co-layers being 0.4 nm and the thickness of the Pt-layers being 1.8 nm. The overall thickness of the multi-layer is varied with values decreasing from 55 nm (curve a), 44 nm (curve b), 33 nm (curve c), 20 nm (curve d), 11 nm (curve e) to 6.6 nm (curve f). This Figure shows that the best hysteresis loops are obtained if the thickness of the overall multi-layer is less than approximately 40 nm.

Figure 6:
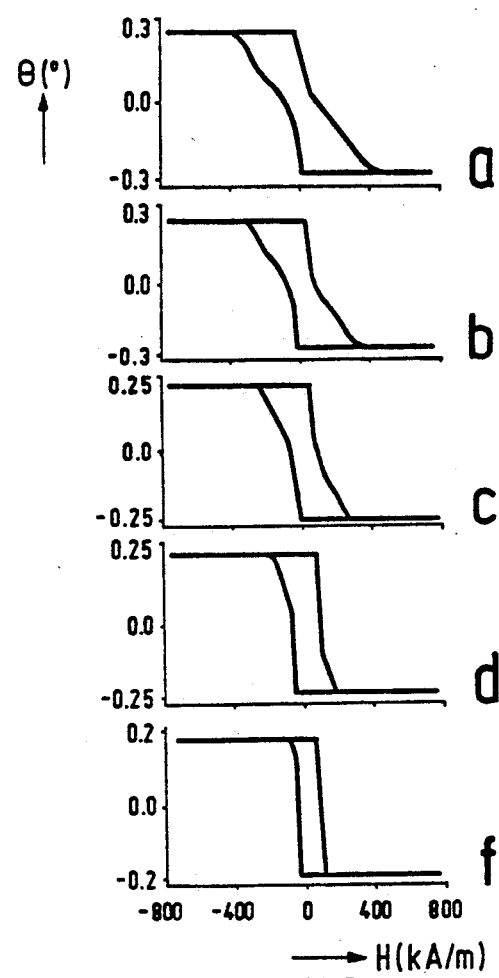
FIG. 6 shows the polar Kerr rotation as a function of the magnetic field applied to a recording layer having still further different thicknesses of Co/Pt multi-layers.

FIG. 6 shows the magneto-optical hysteresis loops measured at a wavelength λ of 530 nm of six still further different multi-layers, the thickness of the Co-layers being 0.4 nm, and the thickness of the Pt-layers being 0.9 nm. The thickness of the total multi-layer decreases from 52 nm (curve a), 40.3 nm (curve b), 30 nm (curve c), 20 nm (curve d) to 10 nm (curve e). This Figure shows that the percentage remanence of the multi-layer is optimal if its overall thickness is less than approximately 40 nm. From measurements of the multi-layers illustrated in FIGS. 5 and 6 it is also derived that the overall thickness of the layers must preferably be greater than 10 nm. At a smaller thickness the coercive force of the layers was found to decrease very rapidly.

Figure 7:
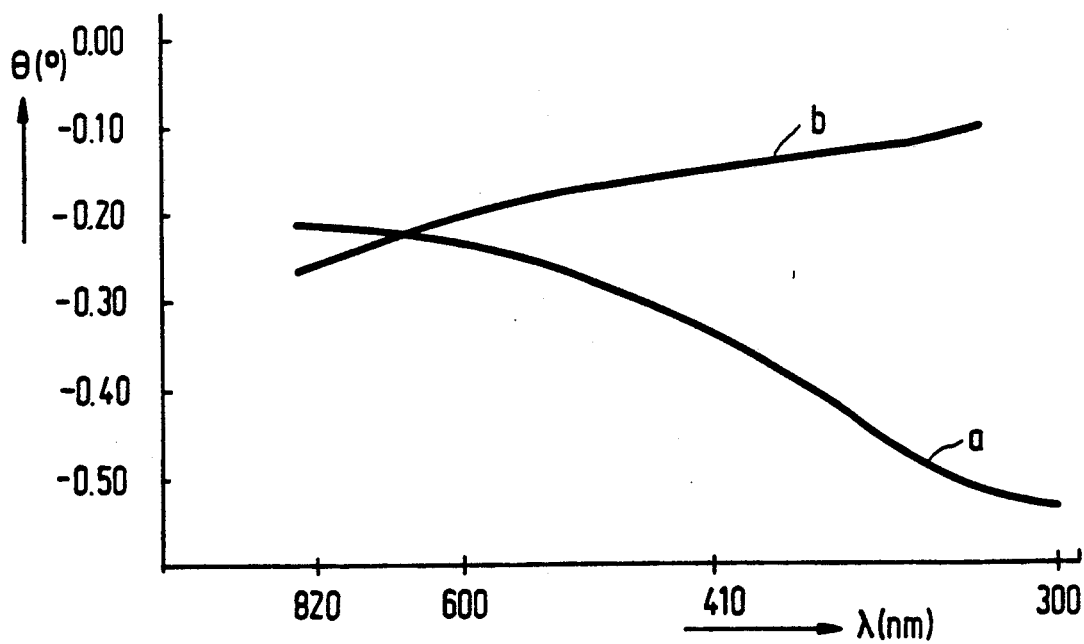
FIG. 7 shows a comparison between the polar Kerr rotation as a function of wavelength for a recording layer of a record carrier according to the invention and a recording layer of GdTbFe as employed in prior-art record carriers.

Curve (a) in FIG. 7 shows the polar Kerr rotation as a function of wavelength of a recording multi-layer (a) described in the preceding paragraph, curve (b) being for a recording layer of comparable thickness of the known GdTbFe-material. The Kerr rotation of the multi-layer in accordance with the invention is significantly greater at shorter wavelengths than the rotation of the prior-art material.

Signal/Noise Measurements

In a further embodiment a glass substrate was provided with a 70 nm thick dielectric layer of AlN, onto which thereafter a 18 nm thick multi-layer recording layer was deposited, which was formed from 0.4 nm thick Co-layers and 1.8 nm thick Pt-layers. The multi-layer was coated with a 90 nm thick dielectric AlN layer on which a 30 nm thick reflection layer of Al was applied. In a number of thermomagnetical recording experiments (v=1.4 m/s; bandwidth 10 kHz f=750 kHz; $t_p$=300 ns, $p_{write}$=6 mW, $H_{write}$=28 kAm) domains (bits) were stored in this recording element. Visual observation through a polarization microscope proved that the stored domains (size approximately $1\mu^2$) were of a substantially perfect shape. The signal-to-noise ratio measured in these experiments was 42.4 dB. The disk noise of the record carrier was better than 15 dB. The write noise was so low that it could not be measured. From further experiments it had been derived that with an optimum composition of the recording layer a signal/noise ratio of 65 dB can be realized.

In another embodiment a glass substrate with a 2-P lacquer was provided with a 80 nm thick dielectric layer of AlN, onto which thereafter a 23 nm thick multi-layer recording layer was deposited, by means of e-beam evaporation, which multi-layer was formed from 0.4 nm thick Co-layers and 0.9 nm thick Pt-layers. The first and the last layer of the multilayer consisted of Pt, so that all the Co-layers were sandwiched between Pt-layers. Contrary to example 4, no dielectric and reflection layers were deposited on the recording layer.

Figure 8:
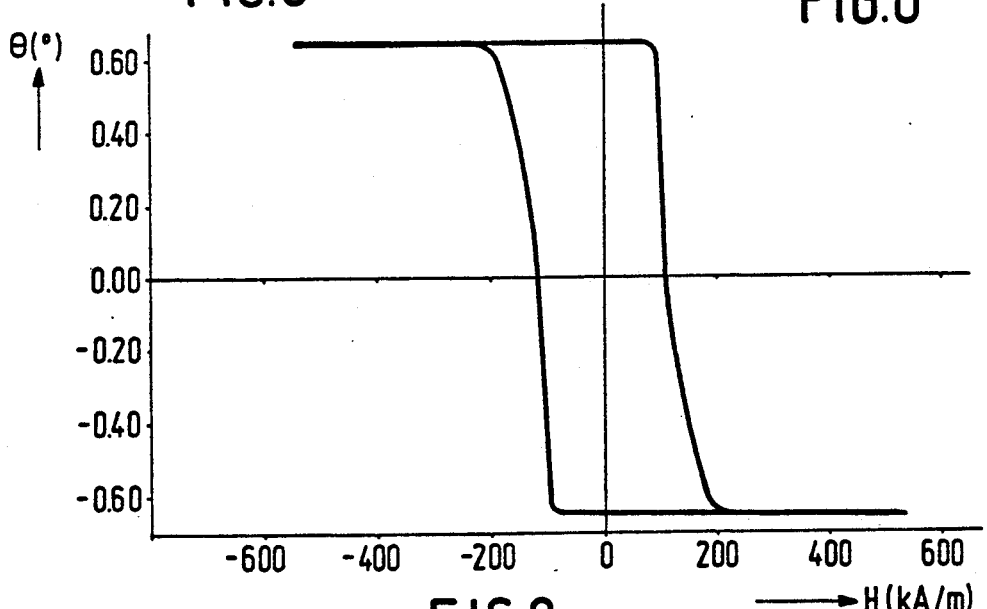
FIG. 8 shows the polar Kerr rotation as a function of magnetic field strength applied to a record carrier comprising of Co/Pt multi-layers.

FIG. 8 shows the Kerr-kysteresis loop of such multilayer as measured through the glass substrate at a wavelength of 820 nm. The $H_C$ value was 112 kA/m. In a number of thermomagnetical recording experiments (v=5 m/s; bandwidth 30 kHz f=1 MHz; $t_p$=400 ns, $p_{write}$=8 mW, $H_{write}$=48 kAm) domains (bits) were stored in this recording element. Visual observation through a polarization microscope proved that the stored domains (size approximately $1\mu^2$) were of a substantially perfect shape. The signal-to-noise ratio measured in these experiments was 53.0 dB. The disc noise was better than 9.3 dB. The write noise was 0.6 dB.

We claim:

1. A record carrier for thermomagnetic recording and magneto-optical readout of information, comprising:
   a substrate with a recording layer thereon in the form of multi-layers of magnetic and non-magnetic material;
   each of said magnetic layers predominantly containing cobalt and having a thickness of not more than 1.2 nm, and each of said non-magnetic layers predominantly containing at least one transition element and having a thickness of not more than 2.4 nm;
   the magnetic and non-magnetic layers laternating with each other, and the overall thickness of the multi-layer recording layer being not more than 75 nm; the total thickness (M) of all of the magnetic layers and the total thickness (N) of all of the non-magnetic layers being in accordance with the relation 1<N/M<5;
   said multi-layer recording layer having a magnetic anisotropy with an easy direction of magnetization perpendicular to the substrate surface, and a sufficiently low Curie temperature so that exposure of local areas thereof to a write layer beam enables a change in direction in such areas of a direction of magnetization of said multi-layer; and
   the local areas of changed magnetization direction constituting recorded information bits, such bits being readable by a polarized read laser beam on the basis of rotation of the polarization plane of such beam caused by said changed direction of magnetization.

2. A record carrier as claimed in claim 1, wherein said non-magnetic layers predominantly contain platinum.

3. A record carrier as claimed in any of claim 1, wherein each of said magnetic layers predominantly containing cobalt have a maximum thickness of 0.6 nm.

4. A record carrier as claimed in claim 1, wherein said multi-layer recording layer has a total thickness of not more than 40 nm.

5. A record carrier as claimed in claim 2, wherein each of said magnetic layers principally contain cobalt and have a thickness of 0.3–0.5 nm, and he thickness of each of said non-magnetic platinum containing layers is 0.8–1.2 nm.

6. A record carrier as claimed in claim 1, wherein said non-magnetic layers predominantly contain palladium.

7. A record carrier as claimed in claim 6, wherein each of said magnetic layers principally contain cobalt and a thickness of 0.3–0.5 nm, and the thickness of each of said non-magnetic palladium containing layers is 0.8–1.2 nm.

8. A record carrier as claimed in claim 1, wherein said non-magnetic layers predominantly contain gold.

9. A record carrier as claimed in claim 1, further comprising a dielectric layer situated between said substrate and said multi-layer recording layer.

10. A record carrier as claimed in claim 1 or 9, further comprising a reflection layer on the side of said multi-layer recording layer most remote from said substrate.

11. A record carrier as claimed in claim 10, further comprising a dielectric layer between said recording layer and said reflection layer.

12. A recording element as claimed in claim 1, wherein said multi-layer recording layer includes at least two such multi-layers which are magnetically non-coupled, said two multi-layers being separated from each other by a spacer layer, the thickness of at least one of said multi-layers being less than 40 nm.

13. A record carrier as claimed in claim 12, wherein said spacer layer contains an organic polymer.

14. A record carier as claimed in claim 12, wherein said spacer layer consists of a photopolymerized lacquer.

15. Q record carrier as claimed in claim 1, wherein said multi-làyer recording layer has a write sector and a parallel extending read sector, the thickness (M) of each of said magenta layers and the thickness (N) of each of said non-magnetic layers being such that the ratio (N/M) in said read sector is less than the ratio (N/M) in said write sector.

16. A record carrier as claimed in claim 15, wherein he overall thickness of said multi-layer recording layer in said read sector and the overall thickness thereof in said write sector are in the ratio of 1 : 3.

17. A record carrier as claimed in claim 15 or 16, wherein each of said non-magenta layers principally contain platinum in said read sector and principally contain palladium in said write sector.

18. A record carrier as claimed in claim 15 or 16, wherein said ratio (N/M) in said read sector is 3/2 and said ratio (N/M) in said write sector is 9/4.

* * * * *